(12) United States Patent
Kim et al.

(10) Patent No.: US 8,936,653 B2
(45) Date of Patent: Jan. 20, 2015

(54) POUCH-TYPE BATTERY AND METHOD OF ASSEMBLING FOR THE SAME

(75) Inventors: Joongheon Kim, Yongin-si (KR);
 Hyungbok Lee, Yongin-si (KR);
 Changsik Kim, Yongin-si (KR);
 Jeongwon Oh, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 1891 days.

(21) Appl. No.: 11/638,376

(22) Filed: Dec. 14, 2006

(65) Prior Publication Data

US 2007/0154794 A1 Jul. 5, 2007

(30) Foreign Application Priority Data

Dec. 29, 2005 (KR) ........................ 10-2005-0134553

(51) Int. Cl.
 *H01M 4/82* (2006.01)
 *H01M 6/00* (2006.01)
 *H01M 2/00* (2006.01)
 *H01M 2/02* (2006.01)
 *H01M 2/08* (2006.01)
 *H01M 10/04* (2006.01)
 *H01M 10/052* (2010.01)
 *H01M 10/058* (2010.01)

(52) U.S. Cl.
 CPC .......... *H01M 10/0436* (2013.01); *H01M 2/021* (2013.01); *H01M 2/0212* (2013.01); *H01M 10/052* (2013.01); *H01M 10/058* (2013.01); *Y02E 60/122* (2013.01)
 USPC ........ 29/623.2; 29/623.1; 29/623.4; 429/163; 429/167; 429/170; 429/171; 429/185

(58) Field of Classification Search
 USPC .................... 429/162; 29/623.1, 623.2, 623.4
 See application file for complete search history.

(56) References Cited

U.S. PATENT DOCUMENTS 4,758,482 A 7/1988 Yamana et al.
6,632,538 B1 10/2003 Yamazaki et al.
(Continued)

FOREIGN PATENT DOCUMENTS

CN 1617379 A 5/2005
EP 0 975 031 1/2000
(Continued)

OTHER PUBLICATIONS

Office Action issued by Chinese Patent Office in Chinese Patent No. 2006101717816 on Jul. 4, 2008.

*Primary Examiner* — Melvin C Mayes
*Assistant Examiner* — Michael Forrest
(74) *Attorney, Agent, or Firm* — Knobbe Martens Olson & Bear LLP

(57) ABSTRACT

A pouch, in which an electrode assembly of a battery is held, including a frame, including a groove into which the electrode assembly is inserted with a front of the electrode assembly temporarily exposed, upper and lower flanges bordering upper and lower ends of the groove, and extended parts on either side of the groove, front and upper sealing parts formed when the extended parts are folded over the front of the electrode assembly and the upper and lower flanges and sealed together and to the upper flange, respectively, the front and upper sealing parts defining a pocket in which an electrolyte solution is injected toward the electrode assembly, and a lower sealing part formed when the folded extended parts are sealed to the lower flange.

9 Claims, 6 Drawing Sheets

(56) References Cited

U.S. PATENT DOCUMENTS

| | | | |
|---|---|---|---|
| 6,797,429 B1 | 9/2004 | Komatsu | |
| 7,285,334 B1 | 10/2007 | Yamashita et al. | |
| 2002/0146621 A1* | 10/2002 | Yageta et al. | 429/181 |
| 2003/0129488 A1* | 7/2003 | Gross | 429/185 |
| 2004/0033416 A1* | 2/2004 | Kim et al. | 429/175 |
| 2004/0048149 A1* | 3/2004 | Gross et al. | 429/127 |
| 2004/0096735 A1* | 5/2004 | Komatsu et al. | 429/176 |
| 2004/0115528 A1* | 6/2004 | Helmich | 429/181 |
| 2005/0069763 A1 | 3/2005 | Hong et al. | |
| 2005/0136324 A1* | 6/2005 | Yamada et al. | 429/175 |

FOREIGN PATENT DOCUMENTS

| | | | | |
|---|---|---|---|---|
| EP | 1 049 180 | 11/2000 | | |
| EP | 1 102 336 | 5/2001 | | |
| EP | 1 519 428 | 3/2005 | | |
| GB | 2 198 877 | 6/1988 | | |
| JP | 62-154550 | 7/1987 | | |
| JP | 1998-050279 | 2/1998 | | |
| JP | 2000-164176 | 6/2000 | | |
| JP | 2000-215862 | 8/2000 | | |
| JP | 2000-285877 | 10/2000 | | |
| JP | 2001084984 A * | 3/2001 | | H01M 2/16 |
| JP | 2003-077435 | 3/2003 | | |
| JP | 2003151507 A * | 5/2003 | | H01M 2/02 |
| JP | 2005-79081 | 3/2005 | | |
| JP | 2005-135837 | 5/2005 | | |
| JP | 2005-166650 | 6/2005 | | |
| KR | 10-2004-0027365 | 4/2004 | | |
| KR | 10-2005-0046636 | 5/2005 | | |
| KR | 2005-46636 | 5/2005 | | |

\* cited by examiner

POUCH-TYPE BATTERY AND METHOD OF ASSEMBLING FOR THE SAME

CROSS-REFERENCE TO RELATED PATENT APPLICATION

This application claims the benefit of Korean Application No. 2005-134553, filed Dec. 29, 2005, in the Korean Intellectual Property Office, the disclosure of which is incorporated herein in its entirety by reference.

BACKGROUND OF THE INVENTION

1. Field of the Invention

An aspect of the present invention relates to a battery, and, more particularly, to a pouch-type battery using a pouch as an external case.

2. Description of the Related Art

Generally, a lithium secondary battery employs a non-aqueous electrolyte due to the reactivity of lithium with water. The non-aqueous electrolyte may be a solid polymer containing a lithium salt or a liquid in which a lithium salt is dissociated in an organic solvent. Lithium secondary batteries may be classified as either a lithium metal battery and a lithium ion battery, which use liquid electrolytes, or a lithium ion polymer battery, which uses a polymer electrolyte, depending upon types of the electrolyte employed by the batteries.

A problem of leakage of an organic electrolyte can occur in a gel-type lithium ion polymer battery containing an organic electrolyte, while the problem does not occur in a solid-type lithium ion polymer battery. This leakage may be prevented by a relatively simple operating method for the lithium ion polymer battery, in comparison with that of a lithium ion battery using the liquid electrolyte. For example, in the lithium ion polymer battery, a multi-layered pouch including a metal foil and one or more polymer membranes, which cover top and bottom surfaces of the metal foil, are used instead of a metal can that is used in the lithium ion battery.

When the multi-layered pouch is used, it is possible to reduce the weight of the battery, to reduce the thickness of the battery, and to relatively freely change the shape of the battery, in comparison with those cases in which the metal can is used.

FIG. 1 is a perspective view of a conventional pouch-type lithium secondary battery illustrating a status in which a pouch is not sealed. As shown in FIG. 1, the conventional pouch-type lithium secondary battery includes an electrode assembly 30 and a pouch 20 to receive the electrode assembly.

With reference to FIG. 1, in a general method of assembling a pouch-type lithium secondary battery, a middle portion of an approximately rectangular pouch membrane is folded to form a front side 21 and a rear side 22 of the pouch. A groove 223, in which the electrode assembly 30 is accommodated, is formed on the rear side 22 by a process, such as a press working process. The indented portion 223 formed in this manner makes an installation of the electrode assembly 30 in post-processes possible, thereby making a performance of the assembling processes relatively easy. In addition, owing to the presence of the groove 223, a sealing part of the pouch 20 around the groove 223 may be arranged, thereby allowing for a compact formation of the pouch.

A multi-layered film, which is formed by sequentially stacking a positive electrode 31, a separator 33, and a negative electrode 35, is wound in a spiral form to form the conventional electrode assembly 30 to form an arrangement resembling a jelly roll. When the jelly roll is formed by winding the multi-layered film, a separator is added to an external electrode surface that is exposed from the jelly roll or an internal electrode surface to prevent an occurrence of a short circuit between the positive electrode 31 and the negative electrode 36. The formed jelly roll is disposed in the groove 223 of the rear side 22, and the front and rear sides 21 and 22 of the pouch 20 are heated and pressed to form a bare cell of a battery while the front side 21 of the pouch 20 and a flange part 225, which is flange shaped, of the rear side 22 of the pouch 20 are brought into tight contact with each other.

Electrode taps 37 and 38 or electrode leads to electrically connect the positive and negative electrodes 31 and 35 of the electrode assembly 30 to an external circuit outside the pouch 20 are respectively formed in one side of the positive electrode 31 and one side of the negative electrode 35. These electrode taps 37 and 38 are formed to be projected from the jelly roll in the direction perpendicular to the winding direction of the jelly roll and are drawn out through one side of the pouch 20 to be sealed.

In the process of sealing the pouch 20, a predetermined ingredient may be added to a surface of the polymer membrane to reinforce the bonding between the polymer membrane inside the pouch 20 and a metal constituting the electrode taps 37 and 38. In addition, an insulating tape 39 may be further included to prevent an occurrence of a short circuit between the electrode taps 37 and 38 and the exterior frame of the pouch 20 before the pouch is sealed.

Accessories or structures such as a protective circuit module (PCM) (not shown) or a positive temperature coefficient (PTC) (not shown) may be attached to the bare cell, of which the pouch has been sealed, to form a core cell. Thereafter, the core cell is inserted into a hard case to form a hard pack battery. Recently, in order to save space of the battery and to simplify the assembling process, a type of a battery has been developed, in which the external shape thereof is formed by closing both ends of a pouch of the battery in the longitudinal direction of the pouch and in which a circuit board and a protection member are attached to the pouch with a hot melt resin. In this type of battery a hard case is not required.

FIG. 2 is a perspective view of a conventional pouch-type lithium secondary battery in a state in which edges of two sides of a bare cell that are opposed to each other from which the electrode taps are not drawn out, are folded. FIG. 3 is an enlarged cross-sectional view of the conventional pouch-type lithium secondary battery taken along line A-A in FIG. 2.

When a hard pack is formed without a folding of sealing parts 25 of the bare cell, or where, more particularly, the sealing parts 25 of two opposite sides from which the electrode taps 37 and 38 are not drawn out, an unnecessary space corresponding to the width of these portions is formed in the hard case. Accordingly, while the core pack is formed of the bare cell, both sealing parts 25 are folded toward the groove 223 in which the electrode assembly is disposed. When the pouch forms an external shape of the battery without an insertion of the pouch into the hard case, the sealing parts 25 of both sides of the pouch are folded to decrease the entire width of the battery in the same way as is described above.

Accordingly, in the processes of assembling the conventional pouch, the groove 223 is first formed on the rear side 22 thereof. Thereafter, a flange part, which is an edge portion around the groove 223, and an edge portion of the front side, which becomes a cover of the groove 223, are welded to each other and sealed. Thereafter, the sealing parts 25, on the opposite sides of the conventional pouch in the widthwise direction are bent toward the groove 223.

Recently, battery makers have been required to provide that two sides of the pouch are formed in a curved shape due to a problem in a design of a pouch-type battery or an electric or electronic device such as a cellular phone that is fitted with the pouch-type battery. Here, since the electrode assembly of the pouch-type battery has an elliptic or track shape and not an angled shape, when the sides of the pouch-type battery are formed in the curved shape, the electrode assembly fits inside the pouch-type battery substantially without any empty space. Accordingly, improvement in capacity-to-volume ratio of the battery may be expected.

However, in the case of the conventional pouch in which the groove is formed, a portion forming the side walls of the groove and a flange part around the groove are approximately perpendicular to each other in a deep-drawing process to form the groove. In other words, angled corners are formed. When both sealing parts are bent toward the groove after the sealing, the bent portions form sharp corners due to the sharp corners which have already been formed in the rear side of the conventional pouch. Thus, it is difficult to form the sides of the pouch into a curved surfaces. Thus, the ratio of capacity to volume of the battery is decreased.

In addition, the entire width of the bare cell of the battery is increased by the width (W+W=2W) of the sealing parts formed on both sides of the pouch. Accordingly, when the width of the battery is fixed to a predetermined value, increasing a space in a widthwise direction of the battery to receive the electrode plates and electrolyte required to increase the capacity of the battery is relatively difficult. In addition, in the subsequent processes, the sharp corners may be easily damaged due to contact with an external part.

SUMMARY OF THE INVENTION

Aspects of the present invention provide a pouch-type battery and a method of assembling the pouch-type battery in which side walls of a pouch receiving an electrode assembly are formed in a curved surface.

Aspects of the present invention also provide a pouch-type battery and a method of assembling the pouch-type battery, in which the capacity-to-volume ratio of the battery is enhanced.

According to an aspect of the present invention, there is provided a pouch-type battery, comprising an electrode assembly, in which first and second electrodes, each comprising an electrode tap, and a separator interposed between the first and second electrodes are stacked and wound; and a pouch-type case including: a rear part having a side wall of a groove, in which the electrode assembly is disposed, a bottom surface of the groove, and a flange part extending from a first pair of opposite sides around the groove and a front part having two extended parts extending from a pair of second opposite sides around the groove, sides of the flange part being connected to the second pair of the sides to cover the electrode assembly disposed in the groove, wherein ends of the two extended parts overlap and are welded to form a front sealing part, and wherein the overlapped portion of the front sealing part over the flange part is at least partially welded to a corresponding portion of the flange part to form upper and lower sealing parts.

In addition, while the two ends of the extended parts are overlapped with and welded to each other, a predetermined tensile force may be applied to the two ends so that a pulling force between the two ends is applied. In this case, forming the short sides in which the second pair of the sides is located as curved surfaces corresponding to an outer circumference surface of the electrode assembly is relatively easy.

According to an aspect of the present invention, there is provided a method of assembling a pouch-type battery, the method comprising: preparing a pouch exterior frame having a groove, two flange parts which are located around the groove and which are opposed to each other, and two extended parts which are opposed to each other; winding and electrode assembly, including two electrodes having electrode taps and a separator interposed between the two electrodes; disposing the electrode assembly in the groove with the electrode taps being drawn out of the pouch exterior frame through one of the flange parts; partially overlapping and welding two ends of the two extended parts with each other on the electrode assembly to form a front sealing part; and forming a seal between at least one of the flange parts and the overlapped portion of the two extended parts.

In addition, the method may further comprise injecting an electrolyte solution into an opening portion of the flange part and the overlapped portion of the two extended parts.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
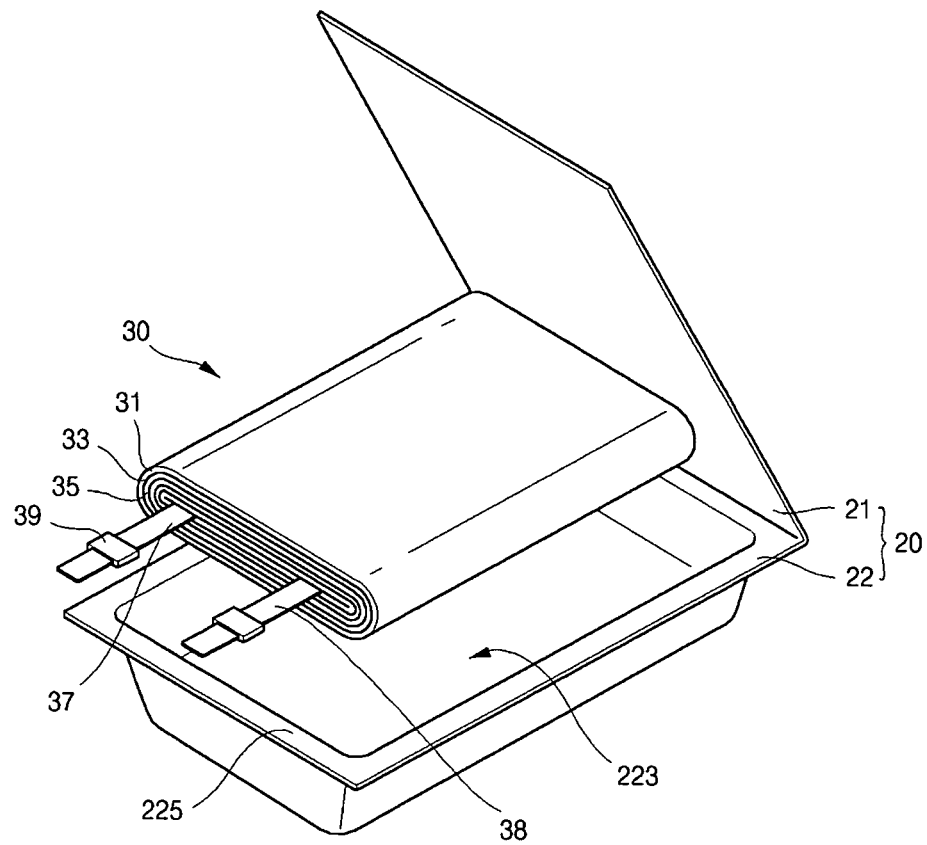
FIG. 1 is a perspective view of a conventional pouch-type lithium secondary battery illustrating a status in which a pouch is not sealed.
Figure 2:
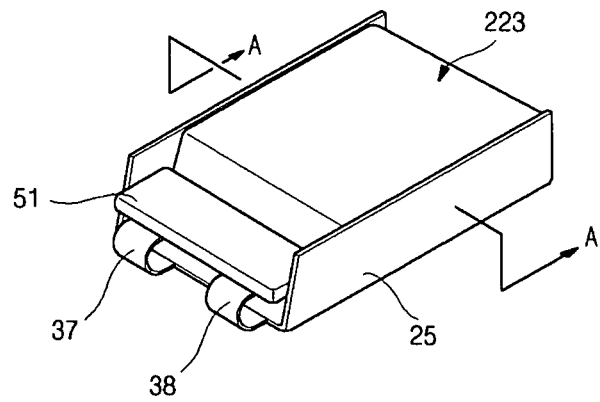
FIG. 2 is a perspective view of a conventional pouch-type lithium secondary battery illustrating a status in which edges of two sides of a bare cell opposed to each other from which the electrode taps are not drawn out, are folded.
Figure 3:
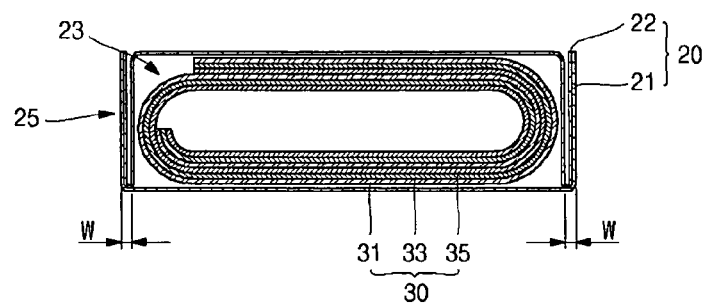
FIG. 3 is an enlarged cross-sectional view of the conventional pouch-type lithium secondary battery taken along line A-A in FIG. 2

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIGS. 4 to 7 are diagrams illustrating major processes for assembling a pouch-type lithium secondary battery according to an embodiment of the present invention.

Figure 4:
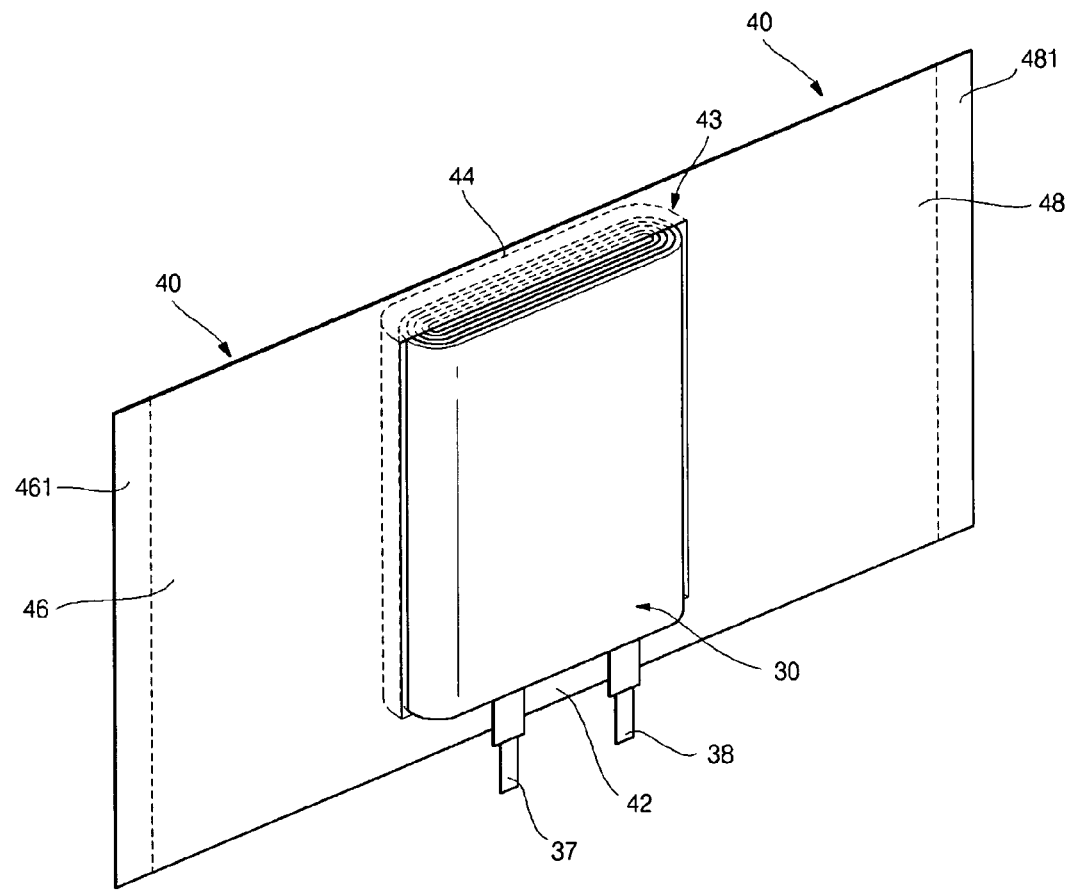
FIGS. 4 to 7 are state diagrams to illustrate an assembly of a pouch-type lithium secondary battery according to an embodiment of the present invention.

FIG. 4 illustrates an electrode assembly 30 disposed in a pouch exterior frame 40 having a groove 43. The groove 43 includes a bottom and a pouch wall body forming four sides. The groove 43 is formed by a deep drawing process, so that corners where the bottom meets the sides form smooth curved surfaces. The groove 43 is formed in a shape of a plane rectangle, and flange parts 42 and 44 are formed around the pair of the short sides of the groove 43, which are to be understood as the first pair of the four sides of the groove 43. Two extended parts 46 and 48 are located on both sides of the pair of the long sides of the groove 43, which are to be understood as the second pair of the four sides of the groove 43, and flange parts 42 and 44 which are connected to the pair of the long sides of the groove 43. The two extended parts 46 and 48 may be formed to have a same width. This shape may be formed by deep drawing a portion of the plane rectangular pouch exterior frame 40 corresponding in size to the groove 43.

Generally, a multi-layered membrane constituting the pouch includes a core part made of a metallic material, such as aluminum (Al), a heat fusion layer formed on an inner side of the core part, and an insulation membrane formed on an outer side of the core part. The heat fusion layer serves as an adhesive layer made of a modified polypropylene such as a casted polypropylene (CPP). The insulation membrane may be made of a resin material such as nylon and polyethylene terephthalate (PET).

The electrode assembly 30 may have an elliptical or track-like shape so as to be similar to a conventional shape of an electrode assembly of a conventional rectangular battery. The electrode assembly 30 may be formed by winding two electrodes and a separator by a mandrel, so that the electrode assembly has a multi-layered structure comprising a separator, a first electrode, a separator, a second electrode or the first electrode, a separator, the second electrode, and a separator.

Each electrode is formed by forming a slurry layer containing an active material on at least one side of a metal foil or a metal mesh comprising a current collection body in which a tap is combined with a portion of the current collection body for an electrical connection to an external circuit.

In the first electrode of this embodiment, a first aluminum electrode tap 37, which is projected a predetermined length from the electrode assembly 30, is welded to a current collection body that is made of an aluminum (AL) material. In the second electrode, a second electrode tap 38, which is generally made of a nickel (Ni) material, and which is projected a predetermined length from the electrode assembly 30, is welded to a current collection body that is made of a copper material. An insulation tape is also provided to prevent a short circuit between the first electrode tap 37 or the second electrode tap 38 and the plane rectangular pouch exterior frame 40.

The first and second electrode taps 37 and 38 are drawn out of the pouch exterior frame 40 via an upper flange part 42 of the pouch exterior frame 40 and, then, are electrically connected to a protection circuit module (not shown) outside the pouch.

The active material of the slurry layer, which is formed on at least one side of a current collection body of the first electrode, may comprise a chalcogenide compound, such as a mixed metal oxide selected from the group consisting of $LiCoO_2$, $LiMn2O_4$, $LiNiO_2$, $LiNi1-X\ CoXO_2$ ($0<x<1$), and $LiMnO_2$. An active material of the slurry layer, which is formed on at least one side of a current collection body of the second electrode, may be selected from the group comprising a carbon (C) based material, a silicon (Si), a tin (Sn), a tin oxide, a tin alloy composite, a transition metal oxide, a lithium metal nitride, or a lithium metal oxide.

According to an embodiment of the invention, the electrode taps 37 and 38 pass through the upper flange part 42 in portions of the pouch exterior frame 40 through which the electrode taps 37 and 38 are drawn out. In this case, a resin tape, which is a type of an insulation tape, may be included in the portion through which the electrode tap is drawn out.

Figure 5A:
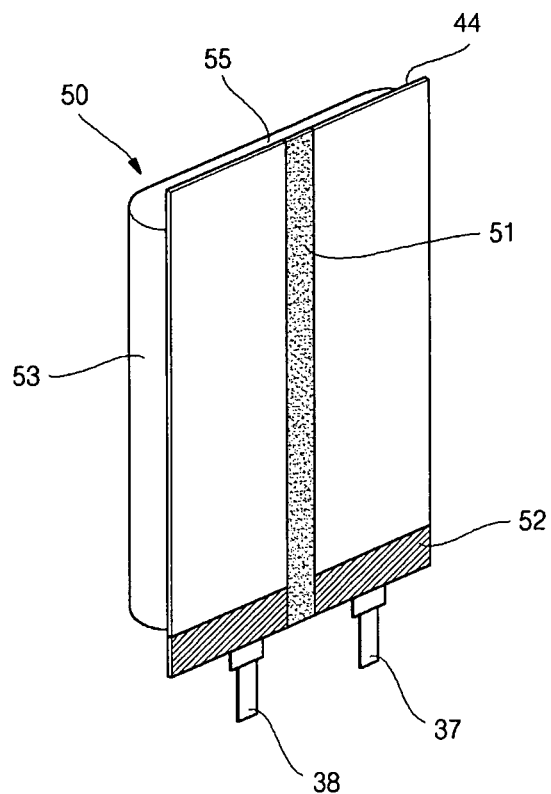
Figure 5B:
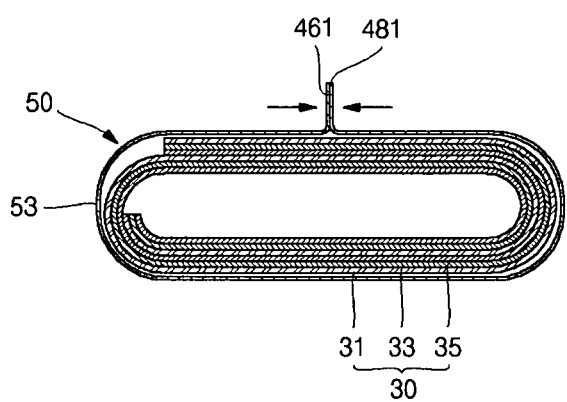
Figure 5C:
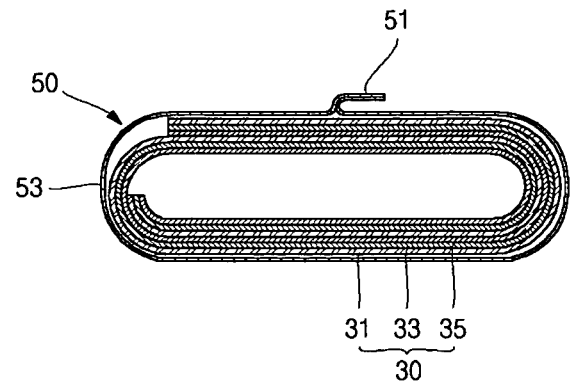

As shown in FIG. 4, the pouch exterior frame 40 is bent along borders between a portion of the pouch exterior frame 40, which includes the groove 43 of the pouch exterior frame 40 and flanges 42 and 44, and the two extended parts 46 and 48, so that the extended parts 46 and 48 cover the electrode assembly 30 in the groove 43. Two ends 461 and 481 of the bent extended parts meet with each other and the upper flange part 42, through which the electrode taps 37 and 38 are drawn out, and are welded to each other, so that an upper sealing part 52 and a front sealing part are formed as shown in FIGS. 5A through 5C. In detail, the two ends 461 and 481 of the extended parts 46 and 48 are welded to each other, so that resin layers having a hot plate weldability, which are located in an inside of the pouch membrane, are opposed to each other as illustrated in FIG. 5B, and a welded front sealing part 51 is folded so as to contact the other extended part of the pouch. Alternatively, the ends 461 and 481, which are to be welded, of the two extended parts 46 and 48 may be disposed in opposition to each other, and the ends 461 and 481 are bent to contact a front side of the pouch. Thereafter, the ends 461 and 481 may be welded to each other. The welding of the two ends and the welding of the upper flange part 42, through which the electrode taps are drawn out, may be performed in an arbitrary order or may be performed simultaneously.

As shown in FIG. 5C, when the two ends 461 and 481 of the extended portions 46 and 48 are welded to each other, the two ends 461 and 481 are then bent toward a middle portion of the pouch exterior frame 40, with respect to a widthwise direction of the pouch exterior frame 40, where the welding occurs, if the welding has not already been completed. In the process, the directions the two ends 461 and 481 each face are changed from a direction facing the outside of the pouch exterior frame 40 to a direction facing the pouch. Accordingly, an angled shape of a portion in which the groove is formed in the pouch exterior frame 40, at which long sides of the groove 43 are connected to the extended parts 46 and 48 is straightened. Here, a curved surface having the same shape as the outer surface of the electrode assembly is formed in a long side portion of the groove 43 of the pouch exterior frame 40, having the outer surface of the electrode assembly 30 as a reference for support, so that an entire side 53 of the pouch-type bare cell forms a curved surface.

Figure 6:
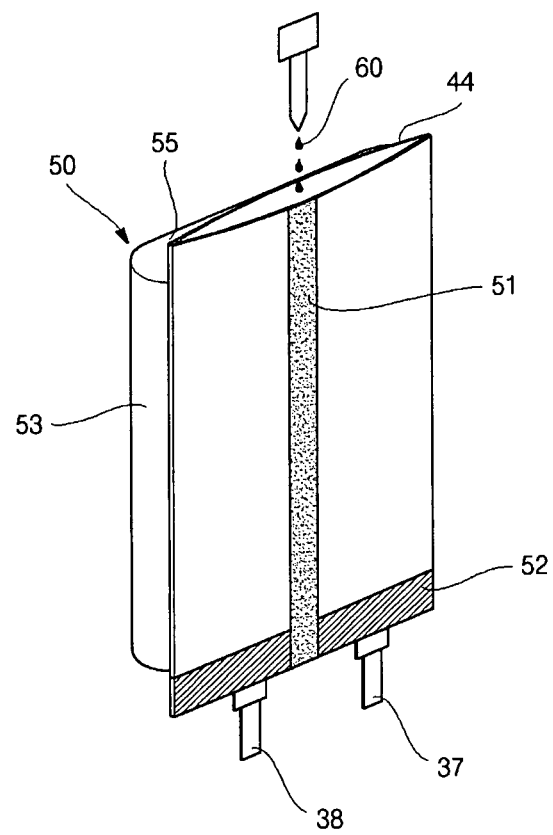

Referring to FIG. 6, a second sealing part (i.e., a lower sealing part) is disposed in a side opposite the first sealing part (i.e., an upper sealing part 52), through which the electrode taps 37 and 38 are drawn out. The second sealing part is not heat welded in the structure illustrated in FIG. 5A so that the second sealing part may act as a pathway to allow for a supplying of an electrolyte solution 60 into the electrode assembly 30 inside. Accordingly, the electrolyte solution 60 may be injected into the open second sealing part inside the pouch.

In conventional pouch-type lithium batteries, the electrolyte solution is injected through the long side of the groove of the pouch. In such batteries, it is difficult for the injected electrolyte solution to flow into the interior of the electrode assembly since the electrolyte solution is blocked by at least one electrode plate. Thus, the electrolyte solution first moves into upper and lower sides of the electrode assembly and flows from the upper and lower sides of the electrode assembly into the inside of the electrode assembly through a gap between the separator and the electrodes.

However, when the electrolyte solution 60 is injected into the open flange part, the upper or lower side of the electrode assembly 30 is reachable through the gap between the electrode plate and the separator. Accordingly, the electrolyte solution may flow relatively easily into inside of the electrode assembly 30. In an alternative embodiment, a portion of the first sealing part 52, through which the electrode taps are drawn out, may be open and the oppositely located second sealing part may be sealed. Here, the electrolyte solution is injected into the first sealing part 52 of the pouch 50.

Figure 7:
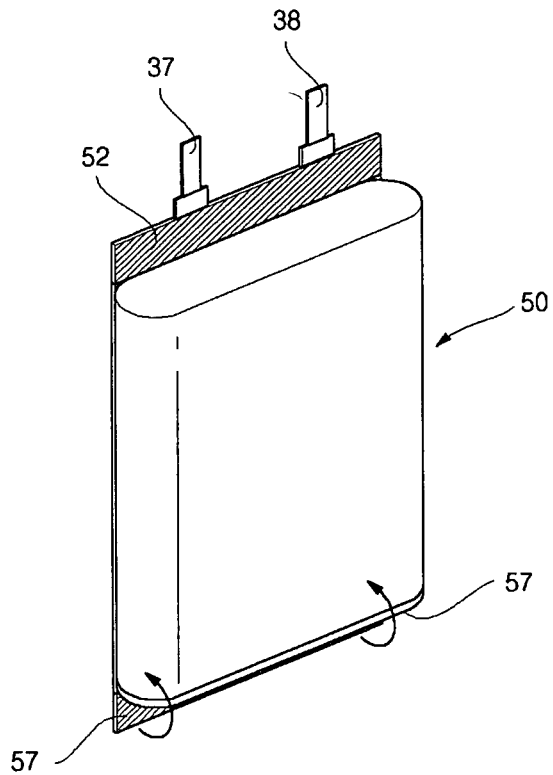

Referring to FIG. 7, in a state in which the electrolyte solution is injected, as illustrated in FIG. 6, heat welding for the opening portion of the flange part is performed to form a lower sealing part 57' so that the pouch is completely sealed from the exterior of the pouch. The lower sealing unit 57' may then be bent to cover the bottom surface 55 in FIG. 6. In this case, since a cover composed of the lower sealing part 57' includes two folds of the multi-layered membrane, the bottom surface portion, which comprises one fold of the multi-layered membrane, may be protected by the cover's support for the bottom surface portion of the pouch-type case.

Figure 8:
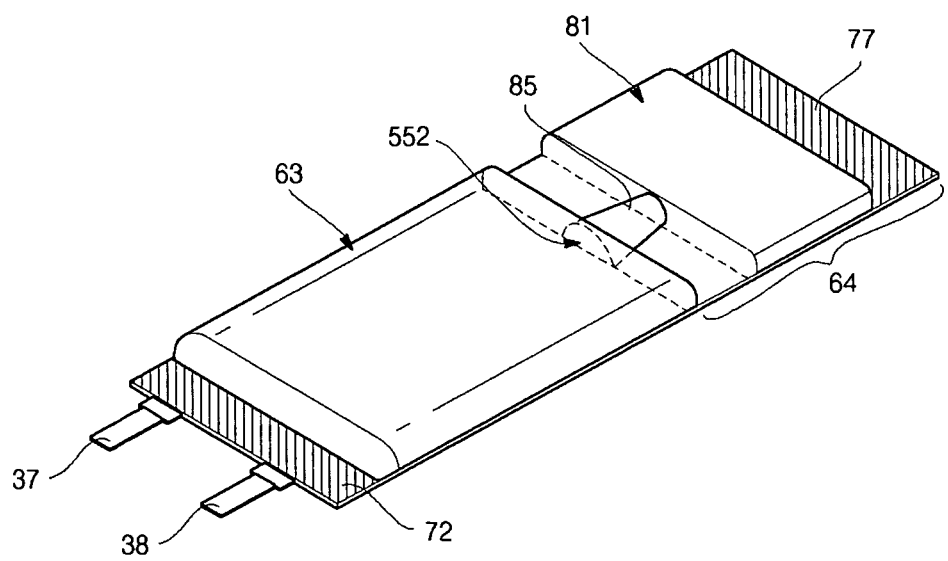
FIGS. 8 and 9 illustrate another embodiment of the present invention.
Figure 9:
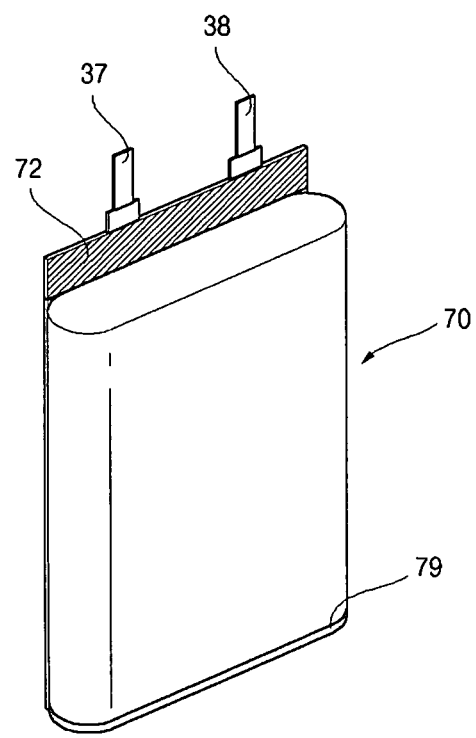

FIGS. 8 and 9 illustrate another embodiment of the present invention. In comparison with the embodiment illustrated in FIG. 7, the second sealing part 64, which is located opposite to the first sealing part 72 of the upper portion is extended in a long direction thereof A gas room 81 is disposed in a portion of the extended part. The groove 63 in which the electrode assembly is disposed and the gas room 81 are connected with each other through a connection groove 85 formed in the second sealing part 64. The connection groove 85 serves as a pathway through which the electrolyte solution is injected, and through which gas is collected into the gas room 81. In order to form the connection groove 85, a side wall 55 for a bottom side wall among the four side walls constituting the groove 63 is partially removed. The removed portion may be regarded as a groove of the side wall 55 formed on the bottom side wall and is hereinafter referred to an opening portion 552. After the electrolyte solution is injected into an open lower flange part 64, the pouch is sealed by welding a lower end 77 of the lower flange part 64. The gas generated from an initial charging process is then collected into the gas room 81 formed in the lower flange part 64.

Thereafter, a final welding portion 79 of the lower flange part 64 of the pouch, which is adjacent to the groove 63, is welded to form a lower sealing part. The gas room 81, into which the gas generated by the initial charging process is collected, and the groove 63, in which the electrode assembly is disposed, are each separated by the welding of the final welding portion 79. A portion of the second flange part 64 located below the final welding portion 79 is then removed. As illustrated in FIG. 9, the final welding portion 79 is bent toward the bottom of the pouch, so that the lower sealing part 79, which is the final welding portion, protects the bottom of the pouch. In this case, the lower sealing part 79 is bent so as to decrease the length of the pouch, thereby increasing the capacity-to-volume ratio of the battery to be assembled.

The opening portion in this embodiment may be formed in the embodiments, in which the gas room is not formed, illustrated in FIGS. 4 to 7. The opening portion prevents the electrolyte solution from being injected unevenly, which may be caused by an injection of the electrolyte solution along the front side of the pouch-type case when the electrolyte solution is injected therein. In other words, the opening portion enables the electrolyte solution to infiltrate the interior of the electrode assembly 30 along the gap, which is formed through the entire bottom surface of the electrode assembly, between the electrode and the separator by evenly supplying of the electrolyte solution to the entire bottom surface, which is exposed through the opening portion, of the electrode assembly 30.

As shown in FIG. 6, a front sealing part 51, which is located in a front side of the formed bare cell of the pouch, may be located between the two electrode taps 37 and 38, which are drawn out of the pouch, in a widthwise direction of the pouch (i.e., a direction in which a first pair of sides is stretched) and may be located in a middle portion of the pouch. For example, generally a tap has a width of about 0.1 mm, and, thus, spaces between the electrode and the separator and between the electrode assembly and the wall body of the pouch in the widthwise direction of the pouch, respectively, are insufficient to allow for a fitting of a portion in which the tap is formed in the electrode assembly. Accordingly, the electrode taps are commonly disposed at positions separated from the electrode assembly so as not to overlap with each other. Two ends of the electrode assembly in the widthwise direction of the pouch form curved portions to reduce the space between the electrodes in the electrode assembly. On the other hand, the remaining portion in which the electrode tap is not located (i.e., a width portion between the electrode taps) has a comparatively sufficient space. Thus, when the front sealing part is disposed in the remaining portion from outside of the pouch, the substantial width of the secondary battery is relatively hardly increased. When the front sealing part 51 is formed, the side 73 of the pouch 70 forms a curved surface along the outer surface of the electrode assembly inside.

Although the embodiments according to aspects of the present invention have been described mainly for the lithium secondary batteries, the present invention, except the initial charging/discharging process and the formation of the gas room, may be applied to all pouch-type batteries.

Further, according to aspects of the present invention, a side of a pouch, which receives an electrode assembly, of the battery may be formed as a curved surface. Thus, relatively easy installation of the battery to an electric or electronic apparatus requiring a curved surface of the battery is possible. In addition, a side wall of the pouch is formed as a curved surface. Thus, receiving an electrode assembly having a cross-section of an ellipse or stadium shape without having an empty space is also possible. Thus, the width of the pouch, compared with a battery in which the sealing part of a pouch is located in the side of the pouch, is decreased, and the capacity of the battery over the volume is increased. In addition, directly injecting the electrolyte solution into top or bottom surfaces is possible, thereby reducing the time required to inject the electrolyte assembly.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of assembling a pouch-type battery comprising an electrode assembly, the method comprising:
providing an electrode assembly, in which first and second electrodes, each electrode comprising an electrode tap, and a separator interposed between the first and second electrodes are stacked and wound;
providing a pouch-type case formed of one membrane, the membrane including a rear part having a groove formed of four side walls, in which the electrode assembly is disposed, a bottom surface of the groove, and a flange part extending from a first pair of opposite sides around the groove, and a front part having two extended parts with inner and outer sides extending from a second pair of opposite sides around the groove, sides of the flange part being connected to the second pair of opposite sides to cover the electrode assembly disposed in the groove, wherein ends of the two extended parts overlap and are welded to form a front sealing part, wherein the overlapped portion of the front sealing part over the flange part is at least partially welded to a corresponding portion of the flange part to form upper and lower sealing parts, and wherein two side walls of the groove are connected to the two extended parts, and the two side walls and portions at which the two side walls and the two extended parts are connected comprise curved surfaces;

disposing the electrode assembly in the groove with the electrode taps being drawn out of the pouch exterior frame through one of the flange parts;

partially overlapping and welding the inner sides of the two ends of the two extended parts with each other on the electrode assembly to form a front sealing part after the electrode assembly is disposed in the groove;

welding at least one of the flange parts and the overlapped portion of the two extended parts, wherein the two ends extend outward from a front side of the pouch;

folding the two welded ends so that one of the two welded ends contacts the front side of the pouch;

injecting an electrolyte solution into an opening portion of each of the flange parts and the overlapped portion of the two extended parts;

sealing the opening portion; and connecting external electric terminals to the electrode taps to perform an initial charging, wherein the welding of the two extended parts comprises applying a tensile force to the two ends during the welding and;

sealing an end, which is separated from the groove, of the lower flange part, from which the electrode taps are not drawn out;

sealing an end portion, which is close to the groove, of the lower flange part to form a lower sealing part after the connecting of the external electric terminals to the electrode taps to perform the initial charging; and removing a lower portion of the lower sealing wherein the preparing of the pouch exterior frame comprises forming a gas room in the lower flange part and forming a connection groove that defines a channel across the lower sealing part between the end and the gas room and that is narrower than the width of the end portion and wherein the removing of the lower portion of the lower sealing part comprises removing a portion in which the gas room is formed.

2. The method according to claim 1, further comprising bending the lower sealing part so as to contact the bottom surface of the pouch-type case, after the removing of the lower portion of the lower sealing part.

3. The method according to claim 1, wherein the forming of the front sealing part and the welding at least one of the flange part and the overlapped portion of the two extended parts are performed substantially simultaneously.

4. The method according to claim 1, wherein electrode taps, which are coupled to the electrode assembly, are drawn out from the electrode assembly through the upper seal, and the lower seal is folded toward the groove to allow the lower seal to be in contacted with the lower surface of the pouch case.

5. The method according to claim 1, wherein a shape of the groove is substantially the same as the outer circumference surface of the electrode assembly corresponding thereto.

6. The method according to claim 1, wherein the positions at which the electrode taps are drawn out are spaced from each other with respect a direction in which the first side wall is extended and wherein the front sealing part is disposed between the positions at which the electrode taps are drawn out.

7. The method according to claim 1, wherein the electrode taps are substantially symmetric with respect to each other, and wherein the front sealing part is disposed at a center.

8. The method according to claim 1, wherein the front sealing part is formed by welding the ends of the two extended parts to each other in a state in which the inner surfaces are opposed to each other.

9. The method according to claim 1, wherein an opening portion is formed in a lower side wall among the side walls forming the groove.

* * * * *